United States Patent [19]

Pauli et al.

[11] 4,435,834

[45] Mar. 6, 1984

[54] METHOD AND MEANS FOR DETERMINING THE STATE AND/OR GENUINENESS OF FLAT ARTICLES

[75] Inventors: Günter Pauli, Eichenau; Günter Krause; Erwin Lob, both of Munich, all of Fed. Rep. of Germany

[73] Assignee: Gao Gesellschaft für Automation and Organisation mbH, Munich, Fed. Rep. of Germany

[21] Appl. No.: 371,425

[22] Filed: Apr. 23, 1982

Related U.S. Application Data

[63] Continuation of Ser. No. 45,802, Jun. 5, 1979, abandoned.

[30] Foreign Application Priority Data

Jun. 6, 1978 [DE] Fed. Rep. of Germany ....... 2824849

[51] Int. Cl.[3] ............ G06K 9/00

[52] U.S. Cl. ............ 382/7; 194/4 R; 235/454; 235/474; 250/556; 382/33; 382/67

[58] Field of Search ............ 194/4 E, 4 F, 4 R; 209/534; 382/7, 30, 33, 34, 36, 37, 67; 250/560-563, 571, 572, 556; 235/419, 454, 487, 474; 356/71

[56] References Cited

U.S. PATENT DOCUMENTS

| | | | |
|---|---|---|---|
| 2,950,799 | 8/1960 | Timms | 194/4 R |
| 2,951,164 | 8/1960 | Timms | 194/4 R |
| 3,239,814 | 3/1966 | Willie | 250/556 |
| 3,436,552 | 4/1969 | Bayha | 250/556 |
| 3,480,785 | 11/1969 | Aufderheide | 194/4 R |
| 3,725,667 | 4/1973 | Schwartz | 194/4 R |
| 4,041,456 | 8/1977 | Ott et al. | 209/534 |
| 4,143,279 | 3/1979 | Ehrat et al. | 250/556 |
| 4,179,685 | 12/1979 | O'Maley | 209/534 |

*Primary Examiner*—Leo H. Boudreau

*Attorney, Agent, or Firm*—Neuman, Williams, Anderson & Olson

[57] ABSTRACT

The invention discloses a method and an apparatus for determining the condition or genuineness of flat articles, in particular bank-notes. The bank-note passes through a test station in which a large portion of its surface is scanned by a scanning system as it passes through. The electric signals generated by the scanning system are edited in an analyzing electronic circuit and compared with suitable limiting values and a signal denoting a faulty position is generated when a certain tolerance is exceeded. At least one surface portion defined in respect of position and size is selected and the electric signals appropriate to the scanning of this surface portion are compared only with limiting values selected for this portion. Thus, it is possible to check the condition and/or genuineness of flat articles, such as sheets of paper, securities, bank-notes and the like while the general rate of rejection and the exact analysis of preferred portions can be equally set alongside one another, without influencing one another, and examined.

36 Claims, 6 Drawing Figures

METHOD AND MEANS FOR DETERMINING THE STATE AND/OR GENUINENESS OF FLAT ARTICLES

Figure 1:
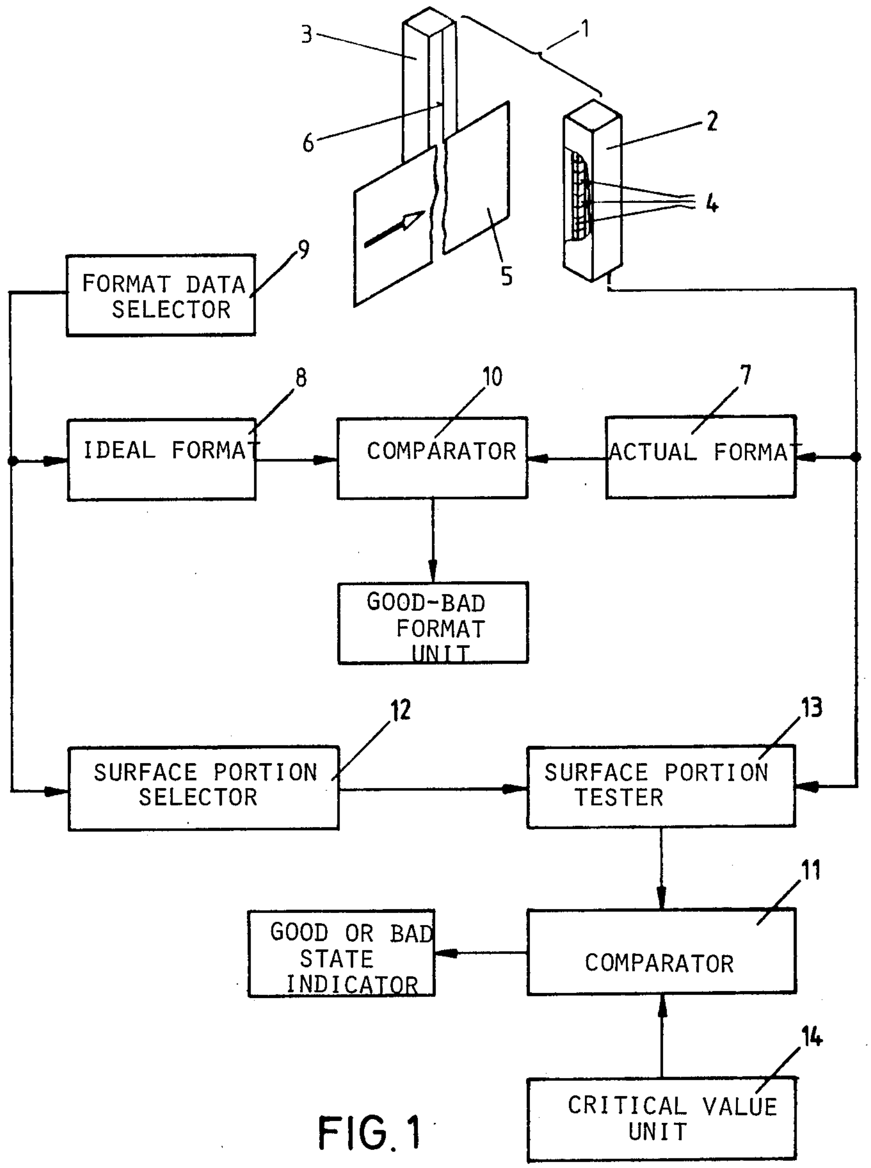

This is a continuation of application Ser. No. 45,802, filed June 5, 1979, now abandoned.

The invention relates to a method for determining the state and/or genuineness of flat articles, in particular bank-notes, in which the article passes through a test station in which a large portion of its surface is scanned while it passes through by means of a scanning system, and the electric signals generated by the scanning system are edited in an analyzing electronic circuit and compared with suitable limiting values, and a signal denoting a faulty portion is generated when a certain tolerance is exceeded. The invention relates, in the same manner, to a means for executing such a method.

It is a common problem, in particular when automatically examining and analyzing securites, bank-notes and the like, that on the one hand too critical an analysis of the articles to be tested leads to unnecessarily high rejection rates. On the other hand, however, an unduly superficial analysis of the condition of bank-notes results in poor detection of counterfeits and forgeries.

Particularly with regard to forgeries, practical experience has shown that the whole portion of a security is never the object of fraudulent alteration. Since forgeries are always intended to change the value or some other identity data of a document, generally speaking, only such portions of a document will be altered which bear identity data.

To ensure that alterations are detected, it is therefore necessary to carefully analyze such portions of a security as are liable to forgery, and to roughly scan the remainder of the security or, in extreme cases, to omit this scanning process altogether. In this manner, the general rejection rate of the securities could be controlled almost as desired by means of an automatic system, while at the same time, forged securities or securities suspected of having being been forged are sorted out with certainty.

Since the forging of securities and the imitation of particular features denoting genuineness or particular portions of a security have proved to be particularly difficult, the already mentioned principle is also applicable to the determination of forgeries, if portions of the security which permit the surest assertion as regards genuineness, are examined in greater detail. The examination of the remaining security portions, which are of less importance for assessing genuineness, can be carried out with greater tolerances without noticeably affecting the indication of genuineness.

In addition to detection of forgeries, this principle can also be successfully applied to the general quality control of sheets of paper, or the like, in the case of which different quality ratings for different surface portions are necessary.

In this regard, the prior art discloses a method for examining a tape passed longitudinally through a light curtain in the German patent specification (Auslegeschrift) No. 2,426,866. The light receiver consisting of several photo diodes arranged adjacent to one another registers faulty portions or flaws in the surface coating of the tape as well as the width of the tape. In this process, the light passing through flaws differs from the light passing through portions of the tape which are free from flaws.

It is further known from a multitude of further patent applications to test individual or a combination of features of bank-notes or securities for the purpose of detecting their genuineness or determining their condition. The German patent specifications (Offenlegungsschriften) Nos. 1,449,212 and 1,524,694 are mentioned in lieu of the numerous applications known in this context.

A common disadvantae of the known testing means comprises the fact that a feature to be examined is always tested with a tolerance which is valid for the whole surface of the security. It is possible to lower the rejection rate in the case of the known testing devices by increasing the degree of tolerance or applying an evaluation measure which is less strict. However, such measures can only be carried out at the expense of the accuracy of the determinaion of genuineness or forgery, respectively. In the case of some detection means known in the prior art, it is possible to exclude certain portions of the test specimen by applying masks (cf. for instance German patent specification No. 1,449,212). Such masking means are, however, not suitable for d ynamic measurement during the conveyance of the bank notes. The surface portions eliminated from the test in this manner are not scanned in any way, and this either leads to mistakes or to complete inability to detect unlawful alterations within such covered portions.

It is, therefore, an object of the invention to provide a detection method and a detection means of the type already described which tests preferably flat articles, e.g. sheets of paper, securities, bank-notes and the like, as regards their condition and/or genuineness and by means of which both the general rejection rate and the exact analysis of preferred portions can be both individually controlled without adversely influencing one another.

The invention solves this object by selecting at least one surface portion of defined position and size from the total scanned surface, for authentication and/or analysis and comparing the electric signals appropriate to this surface portion only with limiting values selected for this portion.

The subordinate claims illustrate further advantageous developments of the invention.

It is a particular advantage of the invention that a different analysis of a specific feature relating to condition or genuineness is possible in different portions of a preferably flat article.

In the quality control of paper sheets, which are either to be printed, already printedor processed in another manner, for instance, the portions which are dominant for the general impression can be analyzed more carefully than the surface portions which are less striking. In the case of paper sheets to be printed with different intensities or surface coverage, the portions of the sheets which remain unprinted, and where a paper flaw is particularly noticeable, can be tested with the greatest amount of accuracy. In the case of paper flaws which may not even be seen when they are printed over, they are completely eliminated from the test or are only roughly examined. Although the finished product still meets the highest demands after this examination, the rejection rate of the sheets to be used in the subsequent printing process can be considerably reduced.

In the case of the examination of used bank-notes as regards genuineness and condition, in particular the regions of the bank-notes containing the serial numbers which are most susceptible to forgery or the portions in which the Central Banks provide bank-notes no longer considered good enough for circulation with cancellation perforations, the bank-notes can be carefully examined with the aid of windows which, in the present example, enclose the portions with the serial numbers and the cancellation perforations. Although the general evaluation of the condition of such bank-notes is not carried out so strictly, the least flaw in the portions containing the serial numbers or the cancellation perforations can thereby lead to their being sorted out.

Since, in the case of different currencies or different types of bank-notes, the serial numbers or the cancellation perforations may be provided on different parts of the bank-notes, it is also possible in a further development of the invention to allot different windows to different types of bank-notes. Thus, it can be ensured that even in the case of mixed processing of different types of bank-notes, that the right window is always allotted to each bank-note and thereby a correct test result is achieved.

The allotment of the windows, which is carried out on the basis of separately determined criterion can be made directly dependent on the format in the case of obvious format differences of different types of bank-notes of the same counting. The German bank-notes are an example of this case. If the different types of bank-notes of one currency are all of the same format, e.g., U.S. bank-notes, a basic color particular to one type of bank-note or any other clearly distinguishable feature may be used. Since, when testing the genuineness of bank-notes, different features relating to genuineness are always tested, the feature on the basis of which a window has been allotted may, in any case, provide inadequate protection against forgery since, on the one hand, the manipulation of this feature may sometimes lead to the allotment of a wrong window, but on the other hand, however, the examination of the various features relating to genuineness, which differ from one bank-note to the next, and which are arranged at different parts of the bank-note, will definitely be negative when based on the resulting bank-note value.

The invention will be described hereinafter in more detail with reference to an exemplary embodiment. For purposes of clarity, the testing of flaws within the surface of the bank-note will be described, and the evaluation of flaws within the portion containing the serial numbers and within the portions containing the cancellation perforations being thereby more carefully graded. It will be clear to an expert, that in a similar manner other features, such as, for instance, opaqueness of the test sample, presence or absence of colors or fluorescences, existence of magnetic properties etc., can be used for the purpose of assessment. It is also obvious that different windows may be used during the examination of a test sample.

Figure 2:
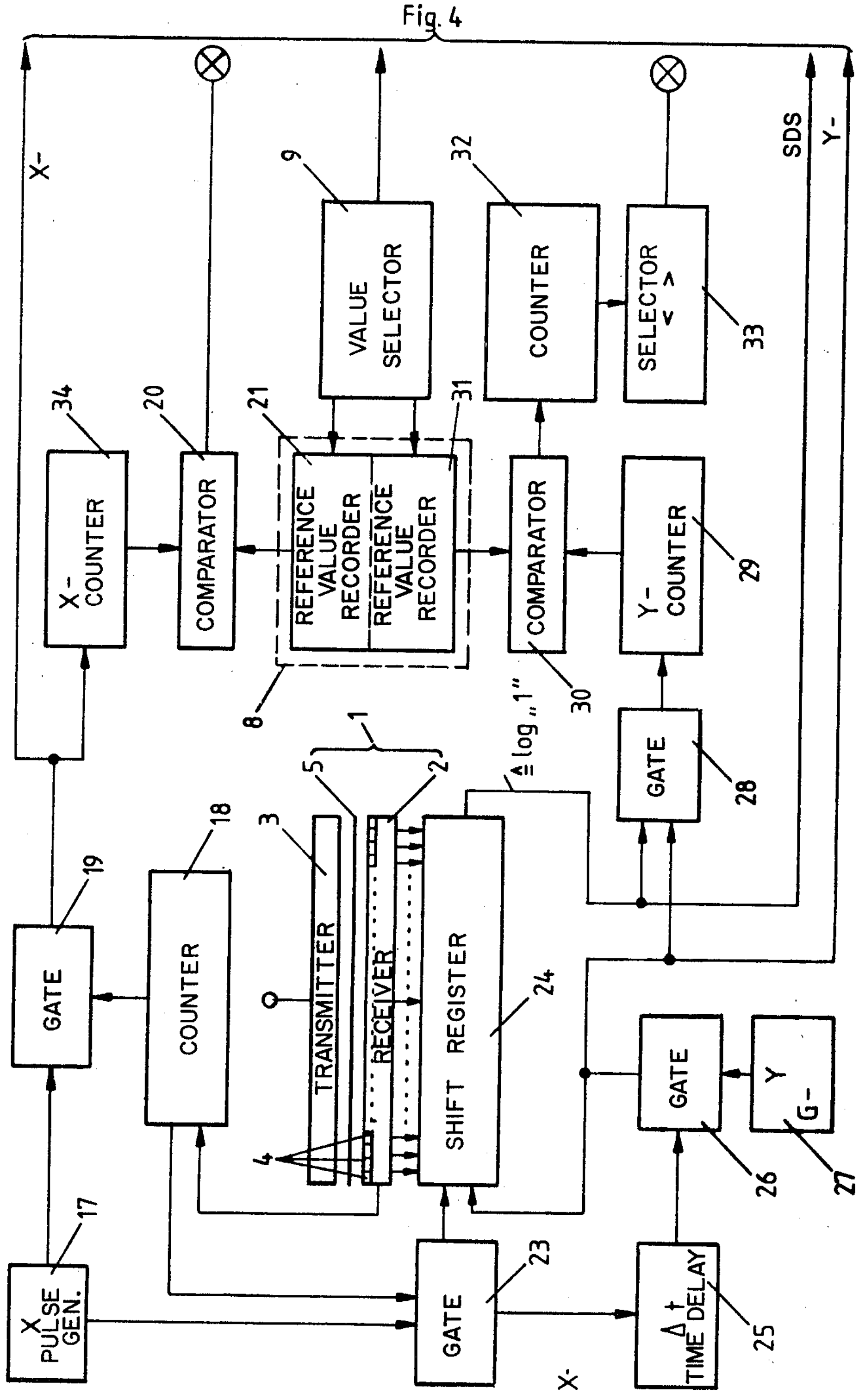
Figure 3A:
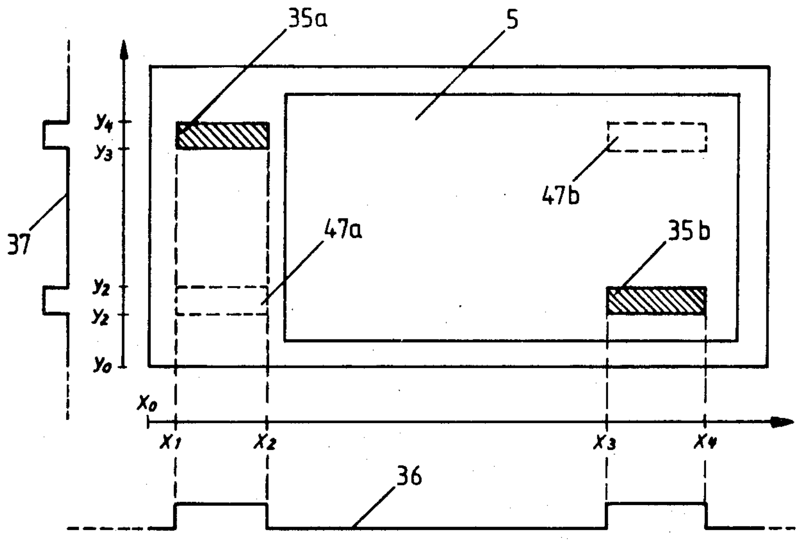
Figure 3B:
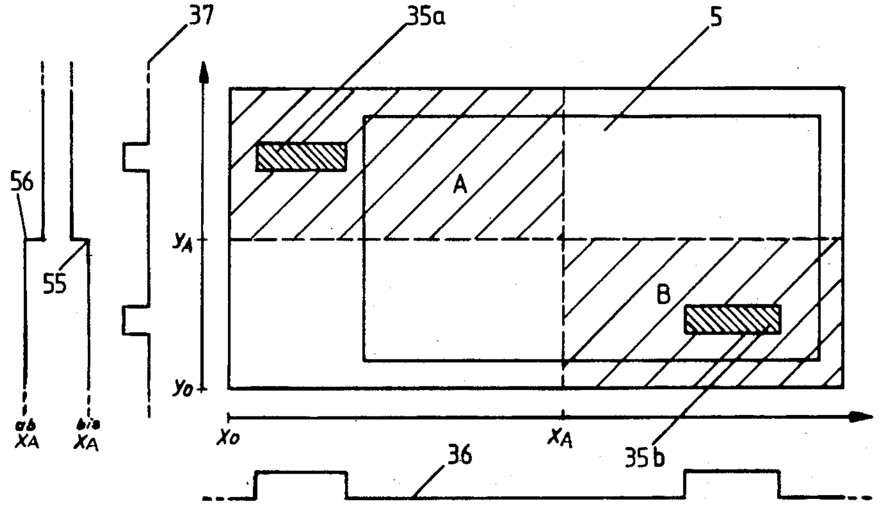
Figure 4:
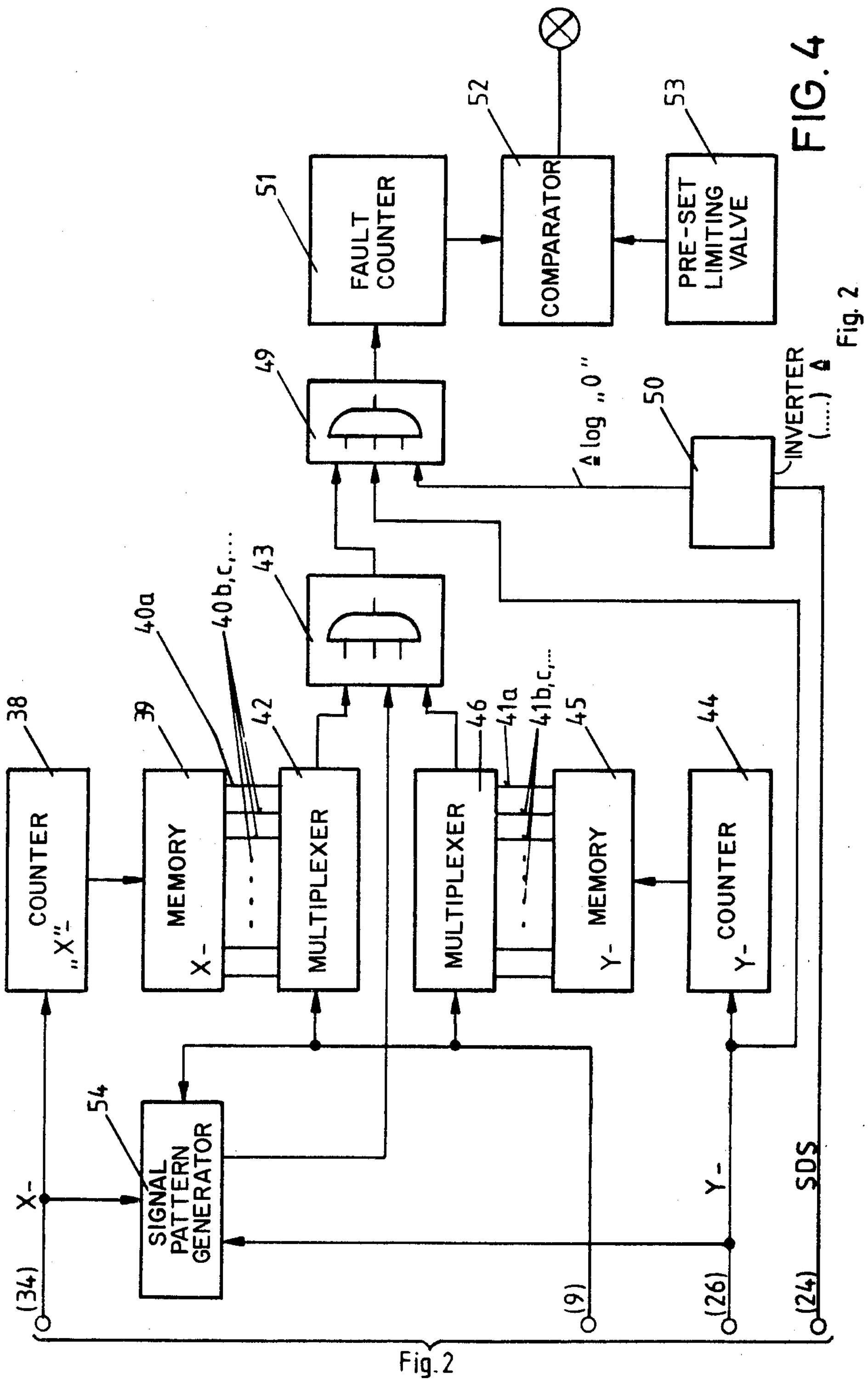
Figure 5:
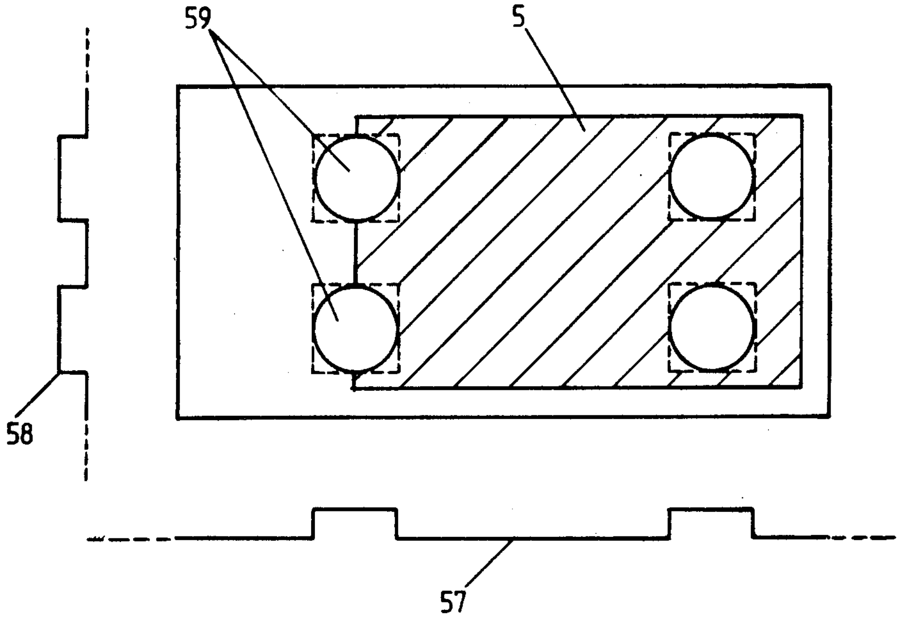

FIG. 1 is a block diagram of a schematically simplified circuit for the execution of the method, FIG. 2 shows a detailed circuit for determining the format of objects, FIGS. 3*a* and 3*b* show a schematically simplified bank-note for illustrating the selection of certain surface portions dependent on the format, FIG. 4 shows a detailed circuit for determining irregularities within defined surface portions and FIG. 5 shows schematically the relationship of bank note perforations and certain signals.

FIG. 1 is a block diagram of an embodiment of the test circuit of the invention. In order to simplify matters, it is first assumed that the articles to be tested are bank-notes and that bank-notes of the same denomination are processed within a test series. The testing of bank-notes of different denominations will be described later in more detail.

As shown in FIG. 1, the scanning system 1 of the test station is a light curtain arrangement comprising a transmitter 3 and an oppositely disposed receiver 2. The transmitter 3 comprises one or more light sources 6, while the receiver consists of a number of photosensitive elements 4, e.g., photo diodes. The number of photo diodes depends on the width or height of the bank-note 5 to be tested, and on the desired accuracy with which the dimensions and any imperfections of the bank-note are to be resolved. Now, if a bank-note 5 passes a light curtain 1 in the manner illustrated in FIG. 1, a corresponding silhouette results on the receiver side. The receiver generates an electrical signal which passes to unit 7 for determining the actual format. The electric data of the ideal format are recorded in unit 8 and can be automatically or manually preselected via unit 9, depending on the type of bank-note being tested. After the bank-note passes through light curtain 1, the ideal and actual values are compared by means of a comparator 10 and a format "good" or format "bad" signal is produced in accordance with the result of this comparison. In the arrangement shown in FIG. 1, it is assumed that the lower edge of the bank-note moves on a sliding surface (not shown) in such a manner that the lowest photo diode in receiver 2 is just covered.

Simultaneously with the preselection of the ideal format in unit 9, certain surface portions particular to each format are predetermined in unit 12 and these surface portions are tested in the foregoing case in view of imperfections in particular. The number, size and position of these surface portions are determined according to the respective problem to be solved (e.g., testing of cancellation patterns) and dependent on format. Parallel to the determination of the format, the electric signals from the photo diodes 4 are transmitted to a unit 13 which tests whether any imperfections of the bank-note are present within the selected surface portions. If the size of the imperfection exceeds a critical value recorded in unit 14, a comparator 11 produces a "poor condition" signal.

Hereinafter, the test of the format of a bank-note will be explained in detail with reference to FIG. 2.

The format test is carried out in such a manner that the length and the width of a bank-note introduced into the light curtain are determined independent of each other and the values obtained are respectively compared with recorded ideal values. Since the dimensions of bank-notes may vary because of manufacturing tolerances, it is necessary to provide tolerance ranges for the length and the width, dependent on the respective type of bank-note, within which the determined actual value must lie.

The measuring unit for determination of the length is defined by the period of an X timing pulse which is produced in unit 17. If the number of impulses of the X timing pulse during the time in which the bank-note passes the light curtain are added up, the sum of the impulses is a measure for the length of the bank-note. The accuracy of the measurement is determined by the period $T_x$ of the X timing pulse. The light curtain comprising transmitter 3 and receiver 2 is also illustrated in FIG. 2 for the sake of clarity. The receiver comprises a row of diodes with n photo diodes 4 arranged adjacent to one another. The entrance of a bank-note is registered in unit 18.

Since, in the case of bank-notes with a missing portion at the beginning or end, the complete number of photo diodes representing the width of the bank-note are not darkened, an OR connection comprising a few selected photo diodes is used for determining the entrance and/or exit of the bank-note. The analysis of all photo diodes, which would further entail a more complicated circuit, is not necessary.

A gate 19 is opened by the signal indicating the entrance of a bank-note so that the X timing pulse can proceed to a counter 34. If the bank-note leaves light curtain 1, which, as mentioned above, is determined by some OR-connected photo diodes, the X pulse is separated from the counter by means of gate 19. The position of counter 34 is compared with a minimum and a maximum ideal value by means of a comparator 20. The values recorded in unit 21 are pre-selected via unit 9 (FIG. 1) before the test begins, dependent on the format of the bank-note to be tested. If, by way of example, the counter position is within the pre-selected tolerance range, the "good" signal appears in respect of the length of the bank-note.

The determination of the width of a bank-note, which takes place at every X timing pulse, is fundamentally carried out by determining the number of darkened photo diodes 4 after the bank-note enters the light curtain 1. While the resolution in the length of the bank-note is determined by the period $T_x$, the resolution in the width of the bank-note is determined by the distance of the photo diodes from one another, i.e., by the number of photo diodes per unit of width.

The determination of the width is transmitted to unit 18 by means of the bank-note entrance signal. With the aid of the entrance signal, the first X timing pulse subsequent to the entrance pulse is transmitted via gate 23 to a shift register 24, thus ensuring that the sigal values of all photo diodes 4 are intermediately recorded parallel to one another. Immediately after the transmission of the data to shift register 24, the X timing pulse, which is delayed in unit 25 for a period amounting to $\Delta t$, to gate 26, in so doing releases a Y timing pulse generated in unit 27 which causes the serial reading out of the data from the shift register. The reading out of data must be completed before the subsequent X timing pulse transmits the new values from a row of diodes to shift register 24, i.e., the period $T_y$ of the Y timing pulse multiplied by the number of photo diodes n must be smaller than the period $T_x$ of the X timing pulse delay periods due to the system and $\Delta t$ not being taken into consideration.

The Y timing pulse is transmitted along with the serial diode signal (SDS), which is read out from shift register 24, to a further gate 28 which then further transmits a Y timing pulse to a subsequent counter 29 if the serial diode signal exhibits the logic "1" state, i.e., if an appropriate diode of the row of diodes has been covered by bank-notes. The counter position reached, which is thus a measure for the width of the bank-note, is subsequently compared via a comparator 30 with a minimum and maximum ideal value recorded in unit 31. If the comparison shows a positive result, a counter 32 connected to comparator 30 is set at "1". At every further positive result, the counter position of counter 32 increases by one. The width of a bank-note is regarded as being good if a minimum number of positive results, which can be preselected in unit 33, are recorded after the bank-note has passed through light curtain 1.

False judgements resulting from holes, creases or tears in the bank-note are avoided by means of the multitude of width determinations.

Hereinafter, it will be described with reference to FIGS. *3a, 3b* and 4 how faults can be determined within preselected regions of a bank-note whose position and size is determined dependent on the format of the particular bank-note to be tested.

First, the determination of preferred regions will now be explained with reference to an example.

FIG. *3a* shows a bank-note 5 with two shaded surface portions *35a, 35b*. The position and dimensions of the shaded portions are each selected in such a manner that they just cover the portions of the bank-note containing the serial numbers. As shown in the diagram, the surface areas which have to be arranged in different positions varying from one type of bank-note to another, because of the varying positions of the serial numbers, can be determined by means of coordinate points. On the X coordinate these are the points $X_1$, $X_2$ and $X_3$, $X_4$ and on the Y coordinate the points $Y_1$, $Y_2$ and $Y_3$, $Y_4$.

In order to analyze surface portions *35a,* and *35b* in view of possible faults, it is now necessary to transform the information obtained from the coordinates into signals which can be electronically analyzed.

To do this, as will now be described in general, an X counter is started upon the entrance of the leading edge of the bank-note which is represented by the coordinate point $X_0$. The counter positions attained for the respective coordinate points $X_1$ to $X_4$ are used as addresses for a memory connected to the counter as the bank-note further passes through the light curtain. The memory is thereby programmed in such a manner that it generates signal pattern 36 shown in FIG. *3a* at one of its exits, independent of coordinate points $X_1$ to $X_4$. In a similar manner, signal pattern 37 is determined for coordinate points $Y_1$ to $Y_4$ with the aid of a second programmable memory. The AND connection of both signal pattern 36 and 37 serves, finally, to form so-called electronic windows which permit the analysis of the surface portions taken in by the windows.

The switching arrangement for forming the electronic windows is shown in FIG. 4.

In accordance with FIG. 4, the X timing pulse (cf. also FIG. 2), appearing after the entrance of the bank-note, is transmitted to a counter 38. If the counter achieves the counter position which is representative of coordinate point $X_1$ (cf. FIG. 3), memory 39, which is programmed with the coordinate switches to logic "1", e.g., at its exit *40a*. A multiplexer 42 connected to the memory is thereby controlled by the preselection switch 9 (FIG. 2) in such a manner that it only connects signaling line *40a* with AND circuit 43. The remaining memory *40b* and *40c* are intended for other types of bank-notes and may be connected to AND circuit 43 as required via the multiplexer 42 by corresponding preselection in unit 9. Signal pattern 36, shown in FIG. 3 appears at exit *40a* of memory 39 upon the continuous increase of the counter position of counter 38 which is coordinated with the movement of the bank-notes via the X timing pulse. After the bank-note has passed through the light curtain, the X timing pulse is blocked and counter 38 returns to 0 so that the process for generating signal pattern 36 may begin anew with the next bank-note.

In accordance with FIG. 4, the Y timing pulse released after the entrance of the bank-note is transmitted to counter 44. The initial value for the counting procedure is the counter position 0 corresponding to the coordinate point $Y_0$ which represents the lower edge of the bank-note. It is thereby assumed that the lower edge of the bank-note always moves on a sliding surface which is at the level of the first photo diode of the row of diodes. When counter 44 reaches counter positions, which are repesentative of the coordinate points $Y_1$ to $Y_4$, after the appropriate Y timing pulses memory 45, programmed with the Y coordinates, produces signal pattern 37 shown in FIG. 3*a*. The signal pattern is finally transmitted to AND circuit 43 via signaling line 41*a* of multiplexes 46 which is selected so as to be dependent on the format. When a row of diodes is interrogated, counter 44 is set back to 0. The remaining memory exits 41*b* and 41*c* are provided for other formats analogous to what has been set forth heretofore.

For analyzing faults, the described signal patterns 36 and 37 are transmitted to AND circuit 49 via AND connection 43. The Y timing pulse and the serial diode signal negated in unit 50 are transmitted to the two remaining entrances of AND circuit 49. If a fault is present in the selected surface portion in which both signal patters, as already explained, exhibit the state logic "1", the serial diode signal also has the state logic "1" because of the negation, i.e. the Y timing pulses are transmitted in this case via AND circuit 49 to a fault counter 51. The number of pulses counted is thereby a measure for the surface extension of the fault. After the bank-note has passed through, the counter position of counter 51 is compared with a preset limiting value in unit 53 via a comparator 52. Then, comparator 52 generates a "good" or "bad" signal depending on the extent of the fault.

The example described heretofore fundamentally describes the determination of faults within preselected surface portions. However, as can be seen in FIG. 3*a*, two further surface portions 47*a* and 47*b* which are dash-lined in FIG. 3*a* and which are unimportant in this particular case, are analyzed in addition to shaded surface portions 35*a* and 35*b*. If it should be the case that there are also faults within the aforesaid portions, the analysis can lead to an incorrect result depending on the size of the faults.

In order to eliminate such mistakes, an additional circuit is provided which will be briefly described hereinafter with reference to FIGS. 3*b* and 4.

As shown in FIG. 3*b*, the total surface of bank-note 5 is divided, for instance, into four sections, and the sections which are relevant in this case and which include the surface portions 35*a* and 35*b* are designated by A and B. If further signal patterns are used to ensure that faults are registered only within section A, as the first half of the bank-note passes through, and only in section B, as the second half of the bank-note passes through, only such surface portions are analyzed in which the serial numbers of the bank-note are contained.

The signal patterns required in addition are generated by means of unit 54 shown in FIG. 4. The X and the Y timing pulses are transmitted to this unit. In addition, the unit is connected to unit 9 "measuring object preselection" in order to thereby be able to set the sections so as to be dependent on the format. The generation of the signal patterns, which are transmitted to AND circuit 43 in addition to the signal patterns already described, is shown in FIG. 3*b*. Parallel to signal pattern 37, which is driven by the Y timing pulse, signal pattern 55 is thereby generated without interruption until the X timing pulse achieves the counter position representative of coordinate point $X_A$. The signal pattern springs at coordinate point $Y_A$ into the logic "1" state, section A being thereby selected first. From coordinate point $X_A$ on, signal pattern 56 is generated and this shows the logic "1" state until coordinate point $Y_A$ is reached, section B being thereby selected.

The example described heretofore illustrates a method for determining faults within preselected surface portions and for accordingly evaluating them dependent on the respectively preselected surface portion.

As indicated in FIG. 5, the masks can be adapted in a simple manner to suit other cases of application by changing signals 36 and 37. As shown in FIG. 5, rectangular window portions of the bank-note are examined in a manner similar to the one already described by means of signals 57 and 58 which are capable of determining the presence of cancellation perforations. Since the window portions formed by signals 57 and 58 are rectangular, although the perforations are circular, portions are also examined for which the required statement is not necessary. However, since rectangular windows are much easier to construct, the deviation from the actual shape of the perforations is deliberately tolerated.

The determination and evaluation of the cancellation perforations can be performed with the same circuit arrangement as described with reference to FIG. 4.

In the present description, only the evaluation of the "window portions" has been described. For analyzing the remaining surface portions, a circuit arrangement of the type already described can be used which corresponds, in principle, to the one described in FIG. 4 and with which by means of corresponding signal patterns surface portions can also be examined which are outside the window portions.

If certain signal levels are also to be taken into consideration when processing the photocell signals, which, for instance, may be necessary when taking the opaqueness of the paper into consideration or when processing brightness values, the signals from photo diodes 4 must be accordingly edited by means of the comparators loaded with the relevant threshold value (not shown). If other threshold values are used for analyzing the window portions than are used for analyzing the surface portions surrounding the window portions, as varied an analysis of the surface portions as desired is possible without the various evaluations influencing one another in their effects.

If the determination of color values is necessary instead of the analysis of brightness values (faulty portions, opaqueness etc.), it is possible to take this into consideration by appropriate filter arrangement in front of photo diode 4 and/or light source 3. In order to analyze non-optical properties, the "light curtain" must be replaced by a "curtain" which is capable of detecting the properties or features to be detected. Accordingly, the analysis of magnetic properties is carried out for instance with a row of magnetic heads instead of a row of photocells or light source row.

The testing of bank-notes of different denominations, currency etc., mentioned previously, in which the values or currencies of the bank-notes which pass the light curtain, perhaps in random sequence, is facilitated, for instance, by automatically controlling the format-dependent selection of surface portions by means of the light curtain. The light curtain thereby first determines the format of the bank-note while the diode signals characterizing the state of the total surface of the bank-note is intermediately stored in a read/write memory. When the format is determined, the multiplex lines provided for the format are released dependent thereon. Then, the contents of the read/write memory are recalled until the subsequent bank-note appears. Thus, the bank-note is examined with a time delay for faults inside of and/or outside of the preselected surface portions, this being then carried out as described heretofore.

What is claimed is:

1. Apparatus for determining the characteristics of a generally rectangular bank note or the like having a pair of end edges and a pair of side edges, scanning means including a plurality of sensor means, said scanning means being operable for sensing the characteristics of a bank note at a plurality of points within a segmental surface area thereof arranged in rows parallel to one of said pair of edges and columns parallel to the other of said pair of edges, reference means for establishing threshold signal levels corresponding to thresholds between acceptable and unacceptable characteristics at points within a certain segmental rectangular surface area of the bank note, comparison means for comparing signals produced by said scanning means with signal levels established by said reference means to generate an output signal when an unacceptable bank note is scanned, and means for controlling said reference means and said scanning means to select for scanning a predetermined segmental area of the bank note.

2. In apparatus as defined in claim 1, said sensor means being arranged in a row parallel to one of said pair of edges, and said scanning means being arranged to effect relative movement of said sensor means and said bank note in a direction transverse to said row of sensor means so as to establish a plurality of columns.

3. In apparatus as defined in claim 2, X timing pulse generating means operable during relative movement of said sensor means and said bank note to develop periodic X timing pulses, and output signal generating means operative in response to said X timing pulses and arranged for developing an output signal corresponding to signals developed by said row of sensor means.

4. In apparatus as defined in claim 3, shift register means for storing signals developed by said sensor means, and means for applying higher frequency Y timing pulses to said shift register means to develop a serial signal forming said output signal.

5. In apparatus as defined in claim 4, Y control means for controlling the timing and duration of said serial signal in relation to said X timing pulses to control the position and dimension of said segmental surface area in relation to the other of said pair of edges of the bank note.

6. In apparatus as defined in claim 3, X control means for controlling the operation of said output signal generating means in relation to the movement of said photocell means in relation to one edge of said one of said pairs of edges of the bank note to control the position and dimension of said segmental surface area in relation thereto.

7. In apparatus as defined in claim 6, said X control means comprising counter means for counting the number of X timing pulses after relative movement of said sensor means past said one edge of said one of said pairs of edges of the bank note, and gate means controlled by said counter means.

8. In apparatus as defined in claim 5, said serial output generating means comprising a pulse generator for generating said higher frequency Y timing pulses, and said Y control means comprising counter means for counting said Y timing pulses, and gate means controlled by said counter means.

9. In apparatus as defined in claim 4, means operable in synchronism with said X timing pulse generating means and in response to signals from said sensor means to develop a first signal corresponding to one edge of the other of said pair of edges and a second signal corresponding to the other edge of said other of said pairs of edges, and counter means for registering the number of said Y timing pulses between said first and second signals to indicate a dimension of the bank note.

10. In apparatus as defined in claim 2, X pulse generating means, and counter means responsive to a first signal developed by said sensor means at one edge of said one of said pairs of edges and a second signal developed at the other edge of one of said pair of edges for counting the number of X pulses to indicate a dimension of the bank note.

11. In apparatus as defined in claim 1, said reference means comprising storage means for storing digital signals corresponding to the coordinants of said certain segmental rectangular surface area of the bank note and to the threshold signal levels corresponding to points therewithin.

12. In apparatus as defined in claim 11, said scanning means comprising means for developing a serial digital output signal in response to the scanning of said bank note, said reference means further comprising means for reading out said stored digital signals to develop a serial reference signal, and said comparison means comprising an AND circuit for responding to said serial digital output signal from said scanning means and to said serial reference signal to develop said output signal.

13. In apparatus as defined in claim 12, multiplexer means associated with said scanning means and said reference means for applying signals to said comparison means.

14. A method for determining the characteristics of generally rectangular bank notes or the like having a pair of end edges and a pair of side edges, comprising the steps of: storing reference threshold signal levels which correspond to thresholds between acceptable and unacceptable characteristics at points within a certain segmental rectangular surface area of a bank note, said points being arranged in rows parallel to one of said pair of edges of a bank note and columns in parallel to the other of said pair of edges thereof, sensing the characteristics of a bank note under test at a plurality of points within a segmental surface area thereof and arranged in rows and columns corresponding to the rows and columns represented by the stored threshold signal levels, and comparing the stored signals with the signals developed during scanning to develop an output signal when an unacceptable bank note is scanned, the segmental rectangular surface area represented by storing of signals and the corresponding scanned rectangular surface area being controlled and correlated according to the characteristics of the type of bank note being tested.

15. Method for the determination of the condition and/or the authenticity of sheet material, particularly bank notes, including the steps of scanning the sheet material along several tracks to generate electrical signals, comparing the amplitudes of said electrical signals with predetermined threshold levels to generate an indicating signal when a certain deviation occurs, the improvement comprising: scanning the whole area of the sheet material in tracks arranged side-by-side while increasing the sensitivity of the scanning in at least one partial area included with said whole area and defined by coordinates according to size and location, each partial area as well as the remaining overall area being scanned with respect to one and the same physical characteristic.

16. Method according to claim 15, characterized in that said scanning of said bank note includes the steps of positioning a light source to pass light through the bank note and to be modulated by the bank note, and positioning photosensitive diodes in a direction rectangular to the direction of transport of the bank note to receive the modulated light.

17. Method according to claim 16, characterized in so positioning said diodes that the output signal of a diode of the row of diodes is set to "logic 1" if said diode is covered by the material of a bank note and that said signal is set to "logic 0" if the diode is not covered by the bank note or a defect portion of the bank note is scanned.

18. Method according to claim 16, characterized in generating an X-timing pulse to control scanning of the overall area of a bank note in accordance with the length and width of said X-timing pulse with said control therein synchronized with the transport speed of the bank note, applying said pulse to increment of counter beginning with the entry of the leading edge of the bank note into the row of diodes and lasting as long as the bank note covers the diodes, operating during said X-timing pulse and during the period of time in which the row of diodes is covered by the bank note to parallel buffer the signals of all the diodes are parallel, and also characterized in generating a Y-timing pulse having a length which equals the length of the X-timing pulse divided by the number of diodes arranged in a row, and applying said Y-timing pulse to control the serial read out of all of the buffered diode signals during the time period of one X-timing pulse and to develop a serial diode signal.

19. Method according to claim 18, characterized in operating after the bank note has passed the row of diodes to compare the accumulated amount of the X-timing pulse counter with a minimum and maximum threshold in order to determine the length of the bank note.

20. Method according to claim 18, characterized in counting the Y-timing pulses as long as the serial diode signal, combined with the Y-timing pulse, is set to "logic "1" and comparing the accumulated count of the Y-timing pulses starting from O during the period of one X-timing pulse with a minimum and maximum threshold in order to determine the width of a bank note.

21. Method according to claim 20, characterized in comparing the number of measurements of the widths of the bank note which are within certain defined limits with a certain determined threshold.

22. Method according to claim 18, characterized in separately counting the X-timing pulses and the Y-timing pulses, setting an X-signal pattern and a Y-signal pattern from "logic 0", to "logic 1", when the counts of said X-timing pulses and Y-timing pulses reach certain amounts which correspond to the coordinates of the corners of selected partial areas, and setting a combined signal to "logic 1" when both said signal patterns are set to "logic 1".

23. Method according to claim 22, characterized in combining the X-signal pattern and the Y-signal pattern with a third signal which depending on the X-timing pulse and the Y-timing pulse oppresses the generation of partial areas within certain portions of the bank note.

24. Method according to claim 22, chracterized in storing reference signals for the coordinates of the selected partial areas.

25. Method according to claim 22, characterized in combining the combined X- and Y-signal patterns, the Y-timing pulse and the negated serial diode signal for the determination of defect portions within selected partial areas counting the resulting signal pulses, and comparing the number of said resulting signal pulses with a corresponding threshold.

26. Method according to claim 25, characterized in setting the parameters of the partial areas in accordance with the characteristics of the subject to be examined.

27. Method according to claim 26, characterized in setting said parameters in accordance with the size of the subject.

28. Method according to claim 26, characterized in setting said parameters in accordance with the optical characteristics of the subject.

29. Apparatus for determining the condition and/or the authenticity of a sheet of material, for example a bank note, and for use with an examination unit including scanning means scanning the sheet along several tracks, said scanning means comprising diodes arranged in a row transverse to a transport direction of the sheet, and a comparator for comparing the electrical signals generated by said scanning means with suitable thresholds, said apparatus being arranged for controlling the scanning of the sheet and generating the corresponding signals and comprising; an X-timing pulse generator for generating X-timing pulses synchronized with the transport speed of the sheet, a shift register arranged to be loaded with the signals of all of said diodes in parallel during the time of one of said X-timing pulses, a Y-timing pulse generator for generating Y-timing pulses, each having a time period corresponding to the time period of an X-timing pulse divided by the number of said diodes, and means responsive to said Y-timing pulses for controlling the serial readout of all diode signals from said shift register during the time period of an X-timing pulse and for developing a serial diode signal.

30. In apparatus according to claim 29, an X-timing pulse counter arranged to be incremented after the leading edge of the sheet has passed said row of diodes for a time period in which the sheet is covering the row of diodes, and a comparator operative after the passing of a sheet for comparing the count of said X-timing pulse counter with minimum and maximum thresholds for determination of the length of the sheet.

31. In apparatus according to claim 30 an Y-timing pulse counter, gate means controlled by said serial diode signal for applying said Y-timing pulses to said Y-timing pulse counter, and a further comparator arranged for comparing the count of the Y-timing pulse counter accumulated during the time period of an X-timing pulse from O with minimum and maximum thresholds for determination of the width of a sheet.

32. In apparatus according to claim 31, means for accumulating the positive results of all width determinations, and a comparator for comparing the accumulated count with a further threshold after the scanning is finished.

33. In apparatus according to claim 29, a X-timing pulse counter, a programmable memory unit connected to said X-timing pulse counter and arranged to be loaded with the X-coordinates of selected partial areas of the sheet and also arranged to provide at its exit an X-signal pattern which is set to "logic 1" within the selected area of coordinates, a Y-timing pulse counter, a programmable memory unit connected to said Y-timing pulse counter and arranged to be loaded with the Y-coordinates of selected partial areas and also arranged to provide at its exit an Y-signal pattern which is set to "logic 1" within the selected area of coordinates, and a first AND-gate responsive to said X-signal pattern and said Y-signal pattern.

34. In apparatus according to claim 32 a second AND-gate for determination of faulty positions within the selected partial areas, the inputs of said second AND-gate being loaded with the output of X-signal said first AND-gate, with said Y-timing pulses and with said negated serial diode signal, a faulty position counter connected to the output of said second AND-gate, and a comparator arranged to compare the count accumulated within said partial area with a certain threshold.

35. In apparatus according to claim 32, a multiplexer responsive to said X-signal pattern and said Y-signal pattern and arranged to transmit signals through to said first AND-gate depending on the size of the sheet to be examined.

36. In apparatus according to claim 32, a unit connected to said first AND-gate and arranged for selecting sections into which the sheet material is divided, said unit being arranged for generating a signal pattern controlled by the Y-timing pulse which is set to "logic 1" within the area of the Y-coordinates of the selected sections and which is set to "logic 0" outside of said areas.

* * * * *

UNITED STATES PATENT AND TRADEMARK OFFICE
CERTIFICATE OF CORRECTION

PATENT NO. : 4,435,834

DATED : March 6, 1984

INVENTOR(S) : Gunter Pauli, Gunter Krause and Erwin Lob

It is certified that error appears in the above-identified patent and that said Letters Patent is hereby corrected as shown below:

Column 1, line 41, delete "being".
Column 2, line 8, "disadvantae" should be "disadvantage".
Column 2, line 16, "determinaion" should be "determination".
Column 2, line 49, "printedor" should be "printed or".
Column 3, line 21, after "of", insert -- a --.
Column 3, line 24, delete "counting" and insert -- country --.
Column 5, line 39, "sigal" should be "signal".

Column 6, line 52, after "the", insert -- X --.
Column 7, line 15, "multiplexes" should be "multiplexer".
Column 11, line 30, (Claim 18), delete "of" and insert -- a --.
Column 11, line 53, (Claim 20), "logic "1" should be -- "logic 1" --.
Column 11, line 65 (Claim 22), delete the comma (,) after "logic 0".
Column 12, line 8, (Claim 23), "chracterized" should be "characterized".
Column 13, line 8, (Claim 33), quotes (second occurrence) are facing wrong way.

Signed and Sealed this

*Eighteenth* Day of *December 1984*

[SEAL]

*Attest:*

GERALD J. MOSSINGHOFF

*Attesting Officer* *Commissioner of Patents and Trademarks*